INVENTOR.
LOUIS PIERRE DEBAILLEUX
BY
Wolfe, Hubbard, Voit & Osann
ATTORNEYS.

Aug. 15, 1961  L. P. DEBAILLEUX  2,996,307
IMPLEMENT TRANSPORTING METHOD AND APPARATUS
Filed Nov. 6, 1959  2 Sheets-Sheet 2

INVENTOR.
LOUIS PIERRE DEBAILLEUX
BY Wolfe, Hubbard, Voit & Osann
ATTORNEYS.

United States Patent Office 2,996,307
Patented Aug. 15, 1961

2,996,307
IMPLEMENT TRANSPORTING METHOD
AND APPARATUS
Louis Pierre Debailleux, Annapes, France, assignor to Massey-Ferguson, S.A., Lille, France, a corporation of France
Filed Nov. 6, 1959, Ser. No. 851,304
Claims priority, application Great Britain Nov. 8, 1958
5 Claims. (Cl. 280—34)

The invention relates to wheeled implements which are intended to be towed by a towing vehicle and which have a substantially greater working width than length, and it is more particularly concerned with the transport of such implements over public roads and through narrow passages or gates.

Implements of the above general character, such as fertilizer distributors, seed drills, etc., when coupled in their normal working relationship to a towing vehicle are difficult to tow from field to field as they are usually too wide to negotiate conventional farm gateways. Moreover, they cannot be towed along public roads without obstructing the roads to other users. It is therefore the usual practice to load such implements on a truck or comparable vehicle for transportation, the loading being in such a way that the effective lateral width of the implement is reduced to afford the necessary clearance. Obviously, such a method of transportation is a laborious and time-consuming task.

One object of the present invention is to provide a simple and efficient transporting device for wide wheeled implements of the above general character which eliminates the loading of the implements onto and unloading them from conventional transporting vehicles.

Another object is to provide a transporting device for implements adapted to travel on widely spaced wheels when operating, which device includes a pair of closely spaced auxiliary wheels attachable to the implement with their axes substantially parallel to the narrowest dimension of the implement whereby to reduce the lateral clearance required for transporting the implement.

Another object is to provide a transporting device which may be quickly and easily attached to the implement when required for transporting the same and as quickly and easily removed to condition the implement for normal operation. An ancillary object is to provide a device of the above type which can be left on the implement if desired and quickly and easily shifted from a transporting position to a retracted position in which it does not interfere with the normal operation of the implement.

Other objects and advantages of the invention will become apparent from the following detailed description of the manner of carrying out the improved method and the preferred form of apparatus employed, reference being had to the accompanying drawings, in which.

Figure 1:
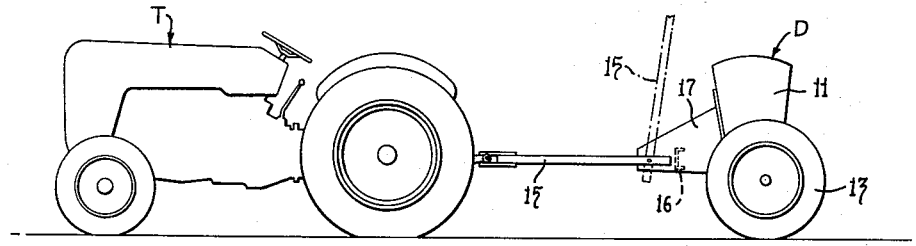
FIGURE 1 is a diagrammatic side elevational view of a wide, wheeled implement coupled to a tractor in its normal operating relation.

While a preferred form of apparatus and a preferred method of using such apparatus has been shown in the drawings and will be described in detail herein, it is to be understood that this is not intended to limit the invention to details of the illustrative embodiment but the intention is to cover all modifications and adaptations falling within the spirit or scope of the invention as more broadly or generally expressed in the appended claims.

For purposes of illustration, the invention has been shown in association with a wide, wheeled implement D adapted to perform its normal operating function while being towed by a power driven vehicle such as a tractor T. The particular implement D shown is a fertilizer distributor. It has a rigid frame including an elongated member 9, herein shown as channel shaped. Welded or otherwise rigidly attached to the ends of the frame member 9 are a pair of upright end plates 10 which support a hopper 11. Axles 12 projecting at opposite ends of the frame member 9 carry ground wheels 13 on which the implement travels in performing its normal operating functions, in this instance, distributing fertilizer.

Figure 8:
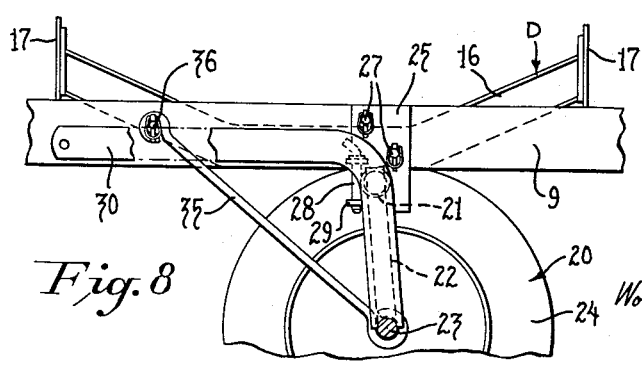
FIG. 8 is a fragmentary sectional view taken in a plane substantially on the line 8—8 of FIG. 6.

The implement is adapted to be connected to the towing vehicle or tractor T by a drawbar 15 which is secured to and extends forwardly from a frame member 16 (FIG. 6) suitably connected to the other elements of the implement frame and spaced outwardly from the hopper substantially centrally of the implement. As herein shown, the frame member 16 comprises a channel shaped beam welded or otherwise secured at opposite ends to a pair of laterally spaced supporting brackets 17 rigid with and extending forwardly from the hopper 11. Preferably, the central portion of the frame member 16 is offset downwardly as shown in FIG. 8 to locate the drawbar connection in a common horizontal plane with the frame member 9. The drawbar 15 is hinged or otherwise attached to the frame member 16 so that it can be swung up and locked in the retracted position shown in broken lines in FIG. 1 when the implement is conditioned for transport.

Implements of the above type are commonly made relatively wide so that they can cover a wide swath in each traverse of a field. This, of course, enhances their efficiency in operation but it makes them difficult to transport between fields when the latter are fenced and have narrow gates and transportation over public highways in their normal operating position is often prohibited. It is therefore customary to transport such implements in conventional trucks or trailers. By reason of their size and weight, the loading of the implements for transport and unloading them for operation is a difficult job and ordinarily requires the time and labor of several men and auxiliary lifting devices.

In accordance with one aspect of the invention, the need for loading and unloading such wide implements for transporting is eliminated by a novel method which includes equipping the implement with a set of auxiliary wheels so that the implement may be towed with its narrowest dimension transverse to the line of travel. To enable the improved method to be used with implements not expressly constructed for that purpose, the invention contemplates the mounting of the auxiliary wheels with their common axis offset laterally from the axes of the axle. More specifically, the invention contemplates the use on an axle having cranked or offset end portions for carrying the wheels so that the latter may be retracted to permit the axle to be attached to the implement while the implement is supported on the wheels on which it normally travels when in operation. The assembled auxiliary wheels and their axle, conveniently referred to hereinafter as a transporting device, after attachment to the implement, is shifted preferably by a rocking movement into a position to raise the implement wheels from the ground, thus transferring implement support from the regular ground wheels to the auxiliary wheels. This shifting is effected in a simple and expeditious manner by using the towing vehicle as the source of power.

In its preferred form the transporting device, indicated generally at 20, is constructed with an axle 21 (FIG. 6) having a straight central portion of a length approximating the narrowest dimension of the implement with which it is to be used, in this instance, the front-to-rear dimension. Extending transversely of the axis at opposite ends of the axle 21 are crank arms 22 carrying axle shafts 23 for auxiliary ground wheels 24.

Figure 2:
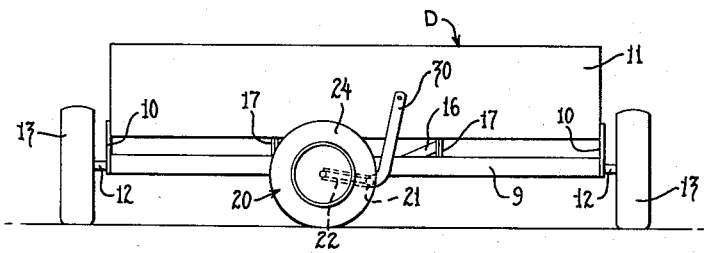
FIG. 2 is a diagrammatic rear view of the implement in process of having the transporting device of the invention attached to it.

Provision is made for attaching the axle 21 to the frame of the implement with the axis of the auxiliary wheels disposed transversely to the axis of the regular ground wheels 13 of the implement. The arrangement is such that the axle 21 may be rocked in the attaching means to permit the transporting device to be mounted on the implement with the wheel supporting arms disposed at an angle to the vertical as shown in FIG. 2. In that posture of the device, the wheels 24 of the device have no lifting effect on the implement. If the clearance below the implement is small, one of the wheels 24 may be detached from its axle shaft to facilitate insertion of the axle under the implement.

Figure 7:
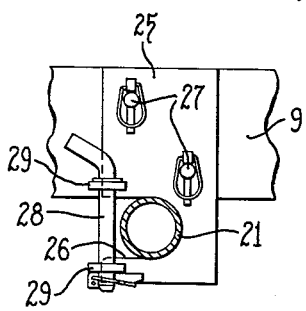
FIG. 7 is a fragmentary sectional view taken in a vertical plane substantially on the line 7—7 of FIG. 6.

While the means for attaching the axle of the transporting device to the implement may take various forms, it is shown herein as comprising a pair of brackets 25 adapted to be attached to the implement frame members 9 and 16 with their lower ends depending below the members. The brackets preferably comprise flat metal plates, each having a laterally opening recess 26 adjacent its lower end dimensioned to receive the axle 21 as shown in FIG. 7. The upper end of the bracket may be permanently secured to the frame member as by welding or it may be removably attached to the frame as shown if desired. Removable attachment is effected, in this instance, by means of cottered pins 27 insertable through matching holes in the brackets and the implement frame members 9 and 16, respectively.

It will be evident that the open recesses in the brackets permit quick and easy insertion or removal of the axle of the transporting device. The axle when inserted may be locked in place by means of cottered latch pins 28 inserted through apertured lugs 29 provided on the brackets and disposed at opposite sides of the opening to the recess 26. It will be understood that the axle 21 is freely rotatable in the bracket recess when locked in place as described.

Figure 3:
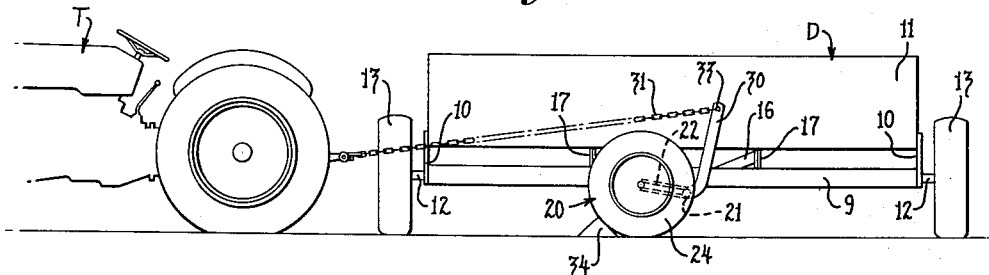
FIG. 3 is a view similar to FIG. 2, showing the manner in which the transporting device is shifted from retracted to implement supporting position.
Figure 6:
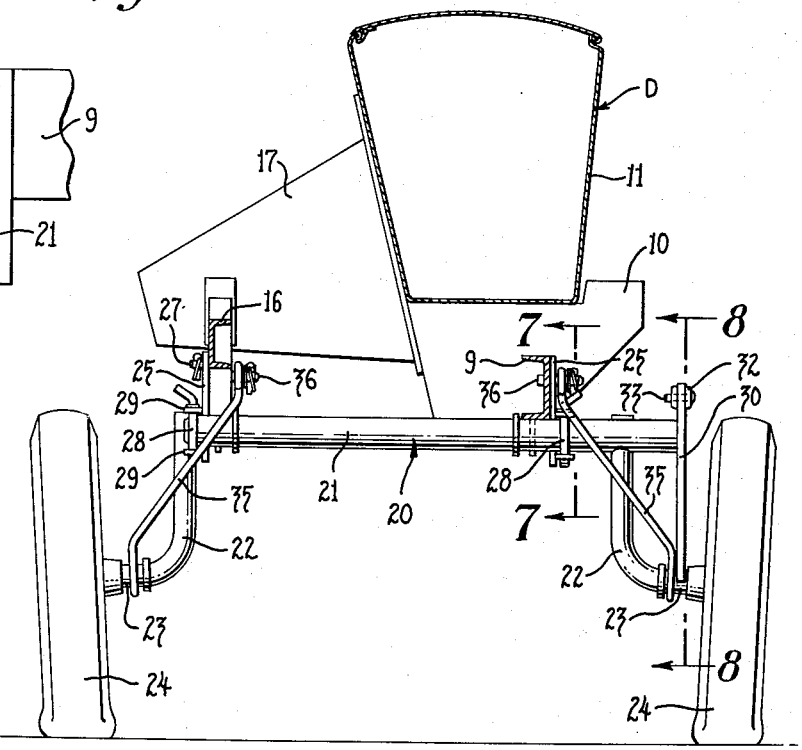
FIG. 6 is a transverse sectional view through the implement showing the transporting device attached to an implement and actuated to the implement supporting position.

After the axle 21 has been attached to the implement frame in the above manner, the transporting device may be shifted from its inactive position to a load supporting position by rocking it in a direction to bring the crank arms 22 to a substantially vertical position. To facilitate this operation, an actuating arm or lever 30 is rigidly attached to the axle 21. As shown in FIGS. 6 and 8, the lever, which is in the form of a bell crank, is secured at a point intermediate its ends as by welding to one end of the axle section 21. One end portion of the lever is desirably extended and recessed to embrace the axle shaft 23 at the same end of the axle. The other end of the lever is arranged to project substantially vertically when the transport device is in the retracted or non-lifting position in which it is shown in FIGS. 2 and 3.

The rocking of the transporting device to operative or implement supporting position may be effected quickly and easily with power supplied by the vehicle used to tow the implement, for example, the tractor T. For this purpose a tension member, herein shown as a chain 31 (FIGS. 3 and 4) is attached at one end to the tractor drawbar while the other end is attached to the upstanding end of the lever 30 as by a shackle 32 and pin 33. With the implement restrained against lateral movement as by a block 34 placed so as to chock the wheels 24, the tractor is driven forwardly to swing the lever 30 from the position shown in FIG. 3 to the position shown in FIG. 4. In this movement, the wheel carrying cranks 22 of the transport device axle are rocked to a generally vertical position and, by reason of their length, the weight of the implement is transferred from the ground wheels 13 to the transporting device.

Figure 4:
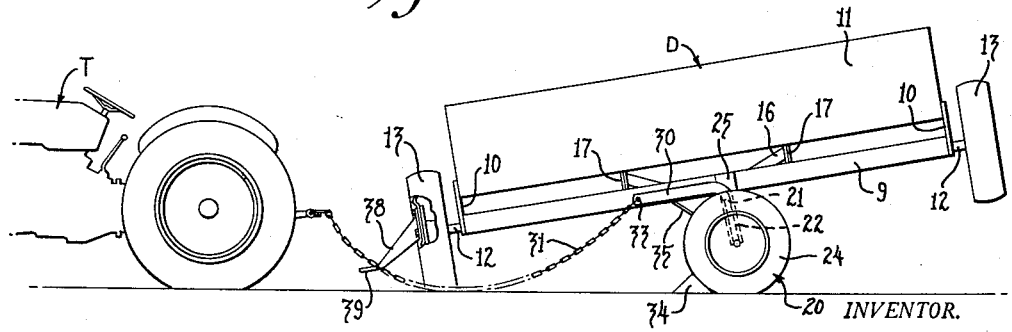
FIG. 4 is a view similar to FIG. 3, showing the transporting device shifted to implement supporting position.
Figure 5:
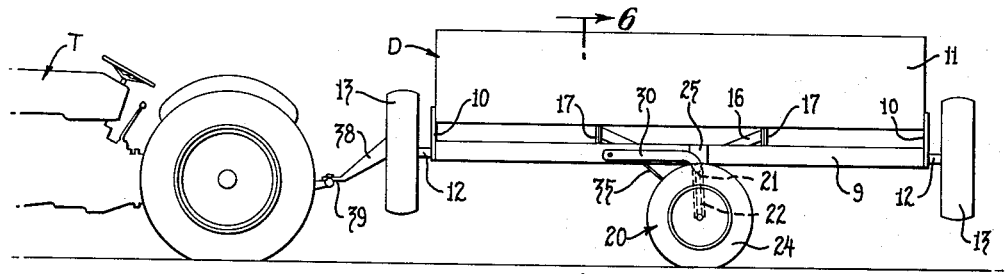
FIG. 5 is a view similar to the preceding figures showing the implement supported on the transporting device and coupled to a tractor for towing purposes.

Preferably the brackets 25 are positioned so as to locate the axle 21 slightly to one side of the center of gravity of the implement. Thus the implement it tilted and only one of the ground wheels 13 is raised clear of the ground as shown in FIG. 4 in the initial lifting operation. When the overbalanced end of the implement is attached to the tractor as shown in FIG. 2, the adjacent end of the implement is thus urged downwardly to provide stability while the implement is being towed.

The transporting device, of course, is locked in implement supporting position during a towing operation. As herein shown, this locking is effected by a pair of tie links 35, each having one end apertured to receive one of the axle shafts 23. The other end of each link is formed to define a hook adapted to be anchored to the implement frame as by a pin 36. Preferably, the tie links are dimensioned so that the crank arms 22 are retained in a position inclined slightly rearwardly from the towing end of the implement and transporting device assembly. The links are thus maintained under tension while the implement is supported on the transporting device.

For transporting purposes the implement is coupled to the towing vehicle or tractor T by means of an auxiliary drawbar 38. This drawbar may conveniently comprise a rigid metal stamping having a flange at one end adapted to be temporarily connected to the implement ground wheel 13 by means of the same bolts which secure the wheel to its hub. The other end of the auxiliary drawbar is flattened as at 39 and may be equipped with suitable coupling means for attachment to the tractor drawbar.

The transporting device of the invention embodies novel features of construction which enable it to be quickly and easily attached to or detached from the implement while in a retracted position and after attachment it may be actuated to implement supporting position in a simple and expeditious manner. Since no heavy lifting is involved, the conversion of the implement for transport and its reconversion for normal operation after transport may be performed by one man, thus eliminating the heavy labor and high costs involved in loading the implement onto a truck or similar vehicle.

I claim as my invention:

1. A transporting device for wide implements of the type adapted in use to travel on a pair of wheels carried at opposite sides of the implement frame, said device comprising, in combination, an axle having a straight central section, crank arms at opposite ends of said straight section supporting ground wheels with their common axis spaced laterally from the section, means for attaching said axle to an implement with the ground wheel axis substantially normal to the axis of the implement wheels, said attaching means permitting the device to be attached with the axle turned to a position in which the crank arms are disposed at an angle to the vertical and the implement supported on its own wheels, means for applying torque to said axle to turn the same, said crank arms being dimensioned to lift the implement from its own wheels and transfer the implement weight to the ground wheels when the axle is turned to position the crank arms generally vertically, and means adapted to be connected between the axle and the implement frame for holding the axle in implement supporting position.

2. A transporting device as defined in claim 1 in which the axle holding means comprises a tie bar adapted to be connected between the implement frame and one of the crank arms.

3. A transporting device for wide implements of the type adapted in use to travel on a pair of wheels carried at opposite sides of the implement frame, said device comprising, in combination, an axle having a straight central section, crank arms at opposite ends of said straight section supporting ground wheels with their common axis spaced laterally from the section, means for attaching said axle to an implement with the ground wheel axis substantially normal to the axis of the implement wheels, said attaching means permitting the device to be attached with the axle turned to a position in which the crank arms are disposed at an angle to the vertical and the implement supported on its own wheels, said attaching means restraining said device against movement in an axial direction while permitting it to be turned about the axis of said straight section, said crank arms being dimensioned to lift the implement from its own wheels and transfer the implement weight to the ground wheels when the axle is turned to position the crank arms generally vertically, and means for rocking said axle to implement supporting position including an actuating lever rigidly fixed to one end of the straight axle section and positioned to extend generally vertically when the axle is initially attached to the implement.

4. A transporting device as defined in claim 3 in which the actuating lever is adapted to be connected by a flexible tension member to a vehicle operative to supply the power for rocking the transporting device to implement supporting position.

5. A transporting device as defined in claim 1 in which the means for attaching the axle to the implement comprises a pair of brackets adapted to be secured to the implement frame and presenting laterally opening recesses for the reception of the axle.

References Cited in the file of this patent

UNITED STATES PATENTS

| | | |
|---|---|---|
| 342,453 | McLean | May 25, 1886 |
| 2,696,772 | Underdown | Dec. 14, 1954 |
| 2,736,567 | McMurray | Feb. 28, 1956 |
| 2,806,707 | Christie | Sept. 17, 1957 |
| 2,876,017 | Knapp | Mar. 3, 1959 |

FOREIGN PATENTS

| | | |
|---|---|---|
| 1,186,991 | France | Mar. 2, 1959 |